United States Patent
Wu

(10) Patent No.: US 10,046,771 B2
(45) Date of Patent: Aug. 14, 2018

(54) METHOD AND APPARATUS FOR TESTING OPERATION AND CONTROL ACCURACY OF DRIVING CONTROL SYSTEM IN UNMANNED VEHICLE

(71) Applicant: BEIJING BAIDU NETCOM SCIENCE AND TECHNOLOGY CO., LTD., Beijing (CN)

(72) Inventor: Yi Wu, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 20 days.

(21) Appl. No.: 15/425,556

(22) Filed: Feb. 6, 2017

(65) Prior Publication Data
US 2018/0029605 A1  Feb. 1, 2018

(30) Foreign Application Priority Data
Jul. 28, 2016  (CN) .......................... 2016 1 0609135

(51) Int. Cl.
| | |
|---|---|
| *B60W 50/04* | (2006.01) |
| *B60W 30/06* | (2006.01) |
| *B60W 30/12* | (2006.01) |
| *B60W 30/18* | (2012.01) |
| *G05D 1/02* | (2006.01) |

(52) U.S. Cl.
CPC ............ *B60W 50/04* (2013.01); *B60W 30/06* (2013.01); *B60W 30/12* (2013.01); *B60W 30/18009* (2013.01); *G05D 1/0219* (2013.01); *B60W 2520/10* (2013.01); *B60W 2550/14* (2013.01); *B60W 2550/30* (2013.01); *B60W 2600/00* (2013.01); *G05D 2201/0213* (2013.01)

(58) Field of Classification Search
CPC ...... B60W 50/04; B60W 30/12; B60W 30/06; B60W 30/18009; B60W 2520/10; B60W 2550/14; B60W 2550/30; B60W 2600/00; G05D 1/0219; G05D 2201/0213
See application file for complete search history.

(56) References Cited

U.S. PATENT DOCUMENTS

| | | | | |
|---|---|---|---|---|
| 4,361,202 A | * | 11/1982 | Minovitch | B60K 31/0008 104/88.02 |
| 4,700,302 A | * | 10/1987 | Arakawa | G05D 1/0265 180/168 |
| 7,469,183 B2 | * | 12/2008 | Bodin | G05D 1/0027 701/23 |

(Continued)

*Primary Examiner* — Russell Frejd
(74) *Attorney, Agent, or Firm* — Lathrop Gage LLP

(57) ABSTRACT

Disclosed is a method and an apparatus for testing operation and control accuracy of a driving control system in an unmanned vehicle. The method comprises determining an operation and control track length when the unmanned vehicle is operated and controlled by the driving control system in the unmanned vehicle, based on obtained traveling data information; determining a standard operation and control distance when the driving control system operates and controls the unmanned vehicle, based on a preset operation and control accuracy test standard; and comparing the operation and control track length with the standard operation and control distance to determine a test result of the operation and control accuracy of the driving control system.

18 Claims, 4 Drawing Sheets

(56) References Cited

U.S. PATENT DOCUMENTS

| | | | |
|---|---|---|---|
| 2003/0055674 A1* | 3/2003 | Nishiyama | G06Q 10/06 |
| | | | 703/8 |
| 2006/0293856 A1* | 12/2006 | Foessel | B60W 30/09 |
| | | | 701/301 |
| 2010/0082195 A1* | 4/2010 | Lee | B62D 15/025 |
| | | | 701/25 |
| 2010/0256835 A1* | 10/2010 | Mudalige | G08G 1/163 |
| | | | 701/2 |
| 2010/0256836 A1* | 10/2010 | Mudalige | G08G 1/163 |
| | | | 701/2 |
| 2010/0292883 A1* | 11/2010 | Nishijima | G05D 1/0274 |
| | | | 701/25 |
| 2016/0313737 A1* | 10/2016 | Berkemeier | G05D 1/0212 |
| 2017/0112045 A1* | 4/2017 | Dix | A01B 69/008 |

* cited by examiner

METHOD AND APPARATUS FOR TESTING OPERATION AND CONTROL ACCURACY OF DRIVING CONTROL SYSTEM IN UNMANNED VEHICLE

CROSS-REFERENCE TO RELATED APPLICATION

This application claims the priority of Chinese Patent Application No. 201610609135.7, entitled "Method and Apparatus For Testing Operation and Control Accuracy of Driving Control System in Unmanned Vehicle," filed on Jul. 28, 2016, the content of which is incorporated herein by reference in its entirety.

TECHNICAL FIELD

Embodiments of the disclosure pertain to the technical field of testing unmanned vehicles, especially to a method and apparatus for testing operation and control accuracy of a driving control system in an unmanned vehicle.

BACKGROUND

An unmanned vehicle means a driverless automobile, which is a highly developed intelligent automobile that integrates technologies such as automatic control, visual computing, system framework. It mainly relies on an in-car driving control system based on a computer system to realize the driverless driving. Unmanned vehicles can be used as an important indicator for assessing the scientific research strength and industrial advancement of a country, and has a broad prospect to be applied to the fields of national defense and national economy.

Currently, domestic and international researches on unmanned vehicles have achieved first accomplishments. However, it is still necessary to conduct more in-depth exploration on the unmanned vehicle in order to productize it, and achieve the goal of safe driving in cities and on highways. Especially for a driving control system operating and controlling the unmanned vehicle in driverless driving, whether the driving control system can operate and control the unmanned vehicle normally and timely in a highly accurate manner contributes to the safety of the vehicle in operation, transportation environment and lives of passengers. The key to whether the driving control system can operate and control the unmanned vehicle normally and timely in a highly accurate manner lies in an operation and control track length formed when the unmanned vehicle is operated and controlled by the driving control system. If the operation and control track length is too long, it indicates that the driving control system for operating and controlling the unmanned vehicle has an inferior operation and control accuracy, which leads to safety risks to the unmanned vehicle during the actual traveling.

In the research and exploration on unmanned vehicles, tests of the performances in all aspects of the unmanned vehicles have become a crucial task. Various methods for testing the unmanned vehicles have emerged. However, among the current methods for testing the unmanned vehicles, there is no method for testing operation and control accuracy of a driving control system.

SUMMARY

The disclosure provides a method and an apparatus for testing operation and control accuracy of a driving control system in an unmanned vehicle, so as to test the operation and control accuracy when the unmanned vehicle is operated and controlled by the driving control system.

Embodiments of the disclosure adopt the following solutions:

In one aspect, embodiments of the disclosure provide a method for testing operation and control accuracy of a driving control system in an unmanned vehicle, the method comprising:

determining an operation and control track length when the unmanned vehicle is operated and controlled by the driving control system in the unmanned vehicle, based on obtained traveling data information;

determining a standard operation and control distance when the driving control system operates and controls the unmanned vehicle, based on a preset operation and control accuracy test standard; and comparing the operation and control track length with the standard operation and control distance to determine a test result of the operation and control accuracy of the driving control system.

In another aspect, embodiments of the disclosure provide an apparatus for testing operation and control accuracy of a driving control system in an unmanned vehicle, the apparatus comprising:

an operation and control track length determination module configured to determine an operation and control track length when the unmanned vehicle is operated and controlled by the driving control system in the unmanned vehicle, based on obtained traveling data information;

a standard operation and control distance determination module configured to determine a standard operation and control distance when the driving control system operates and controls the unmanned vehicle, based on a preset operation and control accuracy test standard; and a test result determination module configured to compare the operation and control track length with the standard operation and control distance to determine a test result of the operation and control accuracy of the driving control system.

The disclosure provides a method and an apparatus for testing operation and control accuracy of a driving control system in an unmanned vehicle. Firstly, an operation and control track length when the unmanned vehicle is operated and controlled by the driving control system is determined based on the traveling data information of the unmanned vehicle obtained. Then, a standard operation and control distance when the driving control system operates and controls the unmanned vehicle is determined based on a preset operation and control accuracy test standard. Finally, a test result of the operation and control accuracy of the driving control system is determined by comparing the operation and control track length with the standard operation and control distance. By using the technical solution disclosed in the disclosure, the operation and control accuracy of a driving control system in an unmanned vehicle can be tested by predetermining an operation and control accuracy test standard, thereby guaranteeing that the driving control system in the unmanned vehicle can operate and control the unmanned vehicle accurately in the practical traveling process, which, in turn, protects the safety of the vehicle in operation, transportation environment and lives of passengers when driving the unmanned vehicle.

DETAILED DESCRIPTION OF EMBODIMENTS

The disclosure is further elaborated in detail with reference to the accompanying drawings and embodiments as follows. It should be appreciated that the depictions of the specific embodiments are only to elaborate the disclosure, not intended for limiting the scope of the disclosure. It needs to be further elaborated that to facilitate the description, the accompanying drawings merely illustrate the portion relevant to the disclosure, rather than the complete content. Before discussing the example embodiments in more detail, it should be mentioned that some exemplary embodiments are depicted as processing or method described in flow charts. The flow charts describe the operations (or steps) as sequential processing, whereas many operations therein can be executed in parallel, concurrently or simultaneously. In addition, the sequence of the operations can be rearranged. The processing can be terminated when an operation is finished, and additional steps not included in the accompanying drawings may also be included. The processing may be corresponding to method, function, procedure, subroutine, subprogram and so on.

Example I

Figure 1:
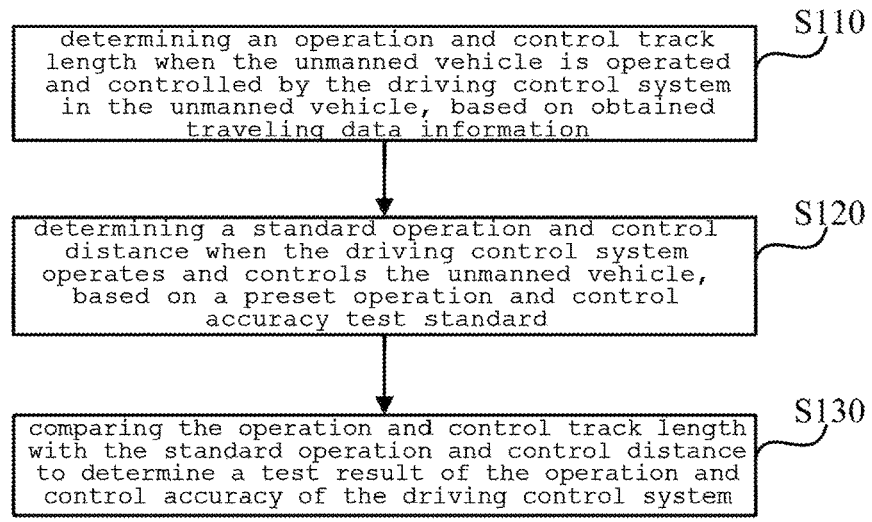
FIG. 1 illustrates a flowchart of a method for testing operation and control accuracy of a driving control system in an unmanned vehicle provided in Example 1 of the disclosure.

FIG. 1 illustrates a flowchart of a method for testing operation and control accuracy of a driving control system in an unmanned vehicle provided in Example 1 of the disclosure. The present example is applicable to testing the operation and control accuracy of a driving control system in an unmanned vehicle, and the method is executed by an apparatus for testing operation and control accuracy of a driving control system in an unmanned vehicle. The apparatus is realizable by hardware and/or software, and is generally able to be integrated in the device for testing various operational performances of the unmanned vehicle.

As shown in FIG. 1, the present embodiment provides a method for testing operation and control accuracy of a driving control system in an unmanned vehicle, the method comprising:

S110: determining an operation and control track length when the unmanned vehicle is operated and controlled by the driving control system in the unmanned vehicle, based on obtained traveling data information.

Generally, testing the operational performances of unmanned vehicle is mainly based on the obtained traveling data information of the unmanned vehicle. Here, the traveling data information can be specifically understood as data information obtained by a data monitoring device provided in the unmanned vehicle in the traveling process. The traveling data information can be the time node information of relevant operations executed in the traveling process of unmanned vehicle, or the specific track node information captured in the traveling process, and so on. Furthermore, the data monitoring device can be provided in vehicle-loaded GPS mobile ending or radar device on unmanned vehicle.

In this example, after the traveling data information of unmanned vehicle has been monitored by the data monitoring device, it can be transmitted by a wireless transceiver device to the testing apparatus for executing the method for testing operation and control accuracy of a driving control system in an unmanned vehicle provided in examples of the present disclosure, thereby allowing the testing apparatus to obtain the traveling data information of the unmanned vehicle. It needs to be elaborated that the data monitoring device has an extremely high accuracy in monitoring the data information in the traveling process of unmanned vehicle. Thus, the accuracy of the obtained traveling data information by the testing apparatus is far higher than the accuracy of data information required for testing.

Generally, for a unmanned vehicle, the driverless driving is substantially realized by its driving control system. Accordingly, the driving control system corresponds to the driver for driving the conventional vehicles. It controls various conditions that might occur during the traveling process of the unmanned vehicle in order to guarantee the safe driving of the unmanned vehicle. When a driverless driving is conducted by a driving control system, a detection module in the driving control system can be relied on for real-time detection of the change in road environment that the unmanned vehicle is currently driving on. Corresponding operating and controlling operations would be executed on the traveling process of the unmanned vehicle when the driving control system detects a change in road environment. For example, the change in road environment may specifically include the change of road condition or traveling condition of other vehicles. The road condition may refer to the change of traffic light, whether the road has warning light or not. The traveling condition of other vehicles may include braking, lane changing or acceleration of other vehicles.

In the present example, during the traveling process of unmanned vehicle, in order to guarantee the safety of driving an unmanned vehicle, it should be ensured the operation and control accuracy for the driving control system to drive the unmanned vehicle not lower than the operational accuracy for a driver to drive conventional vehicles. Specifically, measurement of the operation and control accuracy of a driving control system can be embodied in measuring an operation and control track length. The operation and control track length can be specifically understood as the traveling track length of unmanned vehicle during the period from the driving control system detecting a change in road environment to operate and control the unmanned vehicle based on the change-related operating and controlling command. The traveling track length can be obtained by monitoring with data monitoring device. In addition, it needs to be clarified that the larger the value of operation and control track is, the smaller the operation and control accuracy is.

S120: determining a standard operation and control distance when the driving control system operates and controls the unmanned vehicle, based on a preset operation and control accuracy test standard.

In this example, in order to measure the operation and control accuracy when the driving control system operates and controls the unmanned vehicle, the operation and control track length formed when the driving control system is in practical operation can be measured based on a preset operation and control accuracy test standard. Namely, the operation and control accuracy is measured by comparing the formed operation and control track length with a standard operation and control distance in the operation and control accuracy test standard. Specifically, the operation and control accuracy test standard can be determined before measuring the operation and control track length. Generally, the operation and control accuracy test standard can be viewed as a mapping relation between different standard operation and control distances and different traveling speed values, namely, a standard operation and control distance exists corresponding to traveling at a different traveling speed value.

In the present example, operation and control accuracy test standard is determined by the following approach: firstly determining the standard operation and control distance based on the preset standard response time and different traveling speed values; finally, the mapping relation between the traveling speed value and the standard operation and control distance is set as the operation and control accuracy test standard. Here, the standard response time may be specifically understood as the time consumed by the driving control system from detecting a change in a current road environment to executing relevant control on the unmanned vehicle based on the change. It should be noted that the standard response time taken by the driving control system is generally shorter than the response time taken by regular drivers in driving conventional vehicles.

In addition, the traveling speed value can be specifically understood as the current traveling speed that the unmanned vehicle (motor vehicle) has in practical traveling process. Pursuant to the provisions under the Road Traffic Safety Law of the People's Republic of China, according to different level of road that a motor vehicle is traveling on, the highest traveling speed value allowed is different. For example, pursuant to the Road Traffic Safety Law of the People's Republic of China, for city road without speed limit sign, marking or road central line, a motor vehicle shall not travel at a speed greater than 30 km/h; or for a highway road with two lanes, a motor vehicle shall travel at speeds greater than 60 km/h and 110 km/h respectively on the two lanes. In this example, considering the applicability of operation and control accuracy standard, the driving speed value shall not be selected from a broad range, and can be selected according to the history experience speed values of the motor vehicle in practical traveling. For example, the traveling speed value can be selected from a speed range of 25-120 km/h. For example, starting from 25 km/h, selecting 20 traveling speed values from the speed range of 25-120 km/h by adding 5 km each time. Accordingly, the preset operation and control accuracy test standard comprises 20 traveling speed values.

In this example, when the current traveling speed value of unmanned vehicle is known, a standard operation and control distance corresponding to the current traveling speed value of unmanned vehicle can be determined based on the mapping relation between the traveling speed value comprised in the above preset operation and control accuracy test standard and the standard operation and control distance.

S130: comparing the operation and control track length with the standard operation and control distance to determine a test result of the operation and control accuracy of the driving control system.

In this example, it can be determined whether the operation and control track length formed when the unmanned vehicle is operated and controlled by the driving control system meets the testing standard by comparing the operation and control track length with the standard operation and control distance, thereby determining whether the operation and control accuracy of the driving control system meets the requirement on safe driving. Specifically, if the operation and control track length is longer than the standard operation and control distance, it can be determined that the operation and control track length of the driving control system does not meet the test standard, namely, the safe driving of unmanned vehicle can be guaranteed by improving the operation and control accuracy of the driving control system. Otherwise, it can be determined that the operation and control track length of the driving control system meets the operation and control accuracy test standard, namely, the operation and control accuracy meets the requirements for safe driving, and the unmanned vehicle can be safely operated and controlled by the driving control system.

Example I of the disclosure provides a method for testing operation and control accuracy of a driving control system in an unmanned vehicle. Firstly, an operation and control track length when the unmanned vehicle is operated and controlled by the driving control system is determined based on the obtained traveling data information of the unmanned vehicle; then, a standard operation and control distance when the driving control system operates and controls the unmanned vehicle is determined based on a preset operation and control accuracy test standard; and finally, a test result of the operation and control accuracy of the driving control system is determined by comparing the operation and control track length with the standard operation and control distance. The technical solution proposed in this disclosure can be adopted to test the operation and control accuracy of driving control system in unmanned vehicle by predetermining an operation and control accuracy test standard, thereby guaranteeing that the driving control system in the unmanned vehicle can operate and control the unmanned vehicle accurately in the practical traveling process, which, in turn, protects the safety of the vehicle in operation, transportation environment and lives of passengers when driving the unmanned vehicle.

In this example, it needs to be elaborated that the operating and controlling operations executed by the driving control system to the unmanned vehicle include parking operation and control, lane holding operation and control, and turning operation and control. Specifically, when the driving control system drives an unmanned vehicle, it firstly detects the road environment that the unmanned vehicle is currently driving on by a detection module, so as to determine whether the a current road environment changes; after detecting a change, a control module of the driving control system sends corresponding operating and controlling command based on the change to operate and control the unmanned vehicle.

Generally, the operating and controlling operations include, but are not limited to, parking operation and control, lane holding operation and control, and turning operation and control. For example, if it is detected that the unmanned vehicle is driving near a crossroad or has driven to a crossroad, and the traffic light in the crossroad is red or is going to turn red, it indicates a change in road environment, and the driving control system may determine based on the change that the operating and controlling command to be executed is a parking command. Accordingly, the driving control system can execute a parking operation and control on the unmanned vehicle based on the parking command. For another example, when it is detected that the current road is a turning road, which also indicates a change in road environment, the driving control system may execute a turning operation and control based on corresponding turning command.

It should be noted that the operation and controls described above executed by the driving control system are merely exemplary, and do not mean that the driving control system can only execute corresponding operation and controls under the above conditions. In practical operation and controls of the unmanned vehicle, the above operation and controls can be executed in response to various changes occurred to the road environment, which would not be elaborated in detail here.

Example II

Figure 2:
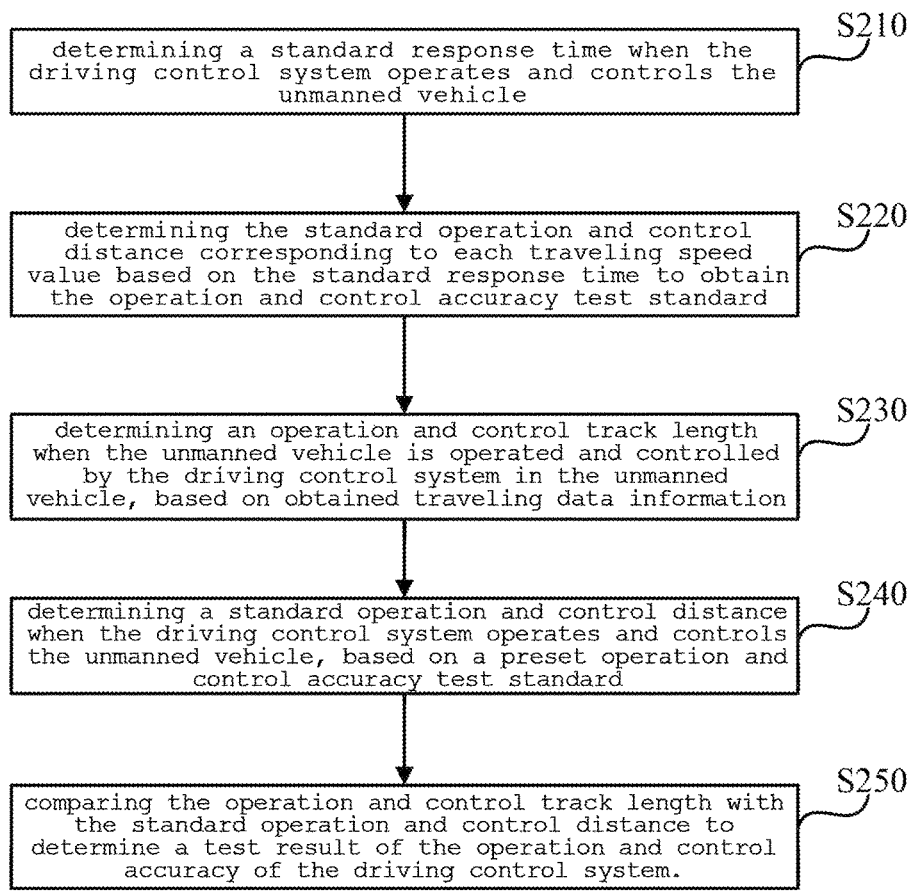
FIG. 2 illustrates a flow chart of a method for testing operation and control accuracy of a driving control system in an unmanned vehicle provided in Example 2 of the disclosure.

FIG. 2 illustrates a flowchart of a method for testing operation and control accuracy of a driving control system in an unmanned vehicle provided in Example 2 of the disclosure. Example 2 of the disclosure optimizes the above example. In this example, the method for predetermining the operation and control accuracy test standard is elaborated. Further, the method for predetermining the operation and control accuracy test standard includes: determining a standard response time when the driving control system operates and controls the unmanned vehicle; and determining the standard operation and control distance corresponding to the traveling speed value based on the standard response time to obtain the operation and control accuracy test standard.

In this example, the operation and control accuracy test standard is determined prior to obtaining the operation and control track length of driving control system in unmanned vehicle, or prior to determining a corresponding standard operation and control distance of the driving control system. As shown in FIG. 2, Example 2 of the disclosure provides a method for testing operation and control accuracy of a driving control system in an unmanned vehicle, the method comprising:

S210: determining a standard response time when the driving control system operates and controls the unmanned vehicle.

In this example, steps S210 and S220 specifically illustrate the process for setting the operation and control accuracy test standard, wherein to set the operation and control accuracy test standard, firstly, a standard response time when the driving control system operates and controls the unmanned vehicle needs to be determined.

Generally, for drivers of conventional motor vehicles, when a driver finds a change in road environment, the brain of the driver requires a response time to operate the motor vehicle correspondingly based on the change in road environment. Due to the physical function, drivers usually need 0.5 to 0.8 second for response. In this example, the driving control system corresponds to the driver in unmanned vehicle, the standard response time corresponds to the response time taken for a driver to execute corresponding operation when a change in road environment is found.

In this example, in order to guarantee the traveling safety of an unmanned vehicle, the standard response time of driving control system usually should not be longer than the response time of the driver, namely, the standard response time should be less than 0.5 second. Specifically, in order to improve the overall performance of the unmanned vehicle, this example preferably set the standard response time between 0.02 s and 0.1 s. For example, the standard response time can be determined as 0.02 s.

S220: determining the standard operation and control distance corresponding to a traveling speed value based on the standard response time to obtain the operation and control accuracy test standard.

In this example, to set the operation and control accuracy test standard, the standard operation and control distance needs to be further determined, and the determination of standard operation and control distance is related to the standard response time and traveling speed values, and the traveling speed values selected correspond one by one to the standard response distances.

Furthermore, determining the standard operation and control distance corresponding to the traveling speed value based on the standard response time comprises:

setting a calculation formula for the standard operation and control distance $D=V*t$, wherein D is the standard operation and control distance corresponding to a traveling speed value, V is a traveling speed value, t is the standard response time when the driving control system operates and controls the unmanned vehicle; and determining the standard operation and control distance corresponding to the traveling speed value based on the calculation formula, the standard response time and at least one traveling speed value.

For example, when it is determined that the standard response time of the driving control system is 0.02 s, and at least one traveling speed value is determined, supposing that one of the traveling speed values determined is 60 km/h, it can be determined that the standard operation and control distance corresponding to the traveling speed value is 33.33 cm based on the calculation formula for calculating the standard operation and control distance. Similarly, the standard operation and control distances corresponding to other traveling speed values may also be determined based on the calculation formula for calculating the standard operation and control distance and the standard response time of the driving control system.

In this example, after determining the corresponding standard operation and control distance of the traveling speed value, the mapping relation between different traveling speed values and the standard operation and control distances, thereby the mapping relation between different traveling speed values and the standard operation and control distances may serve as test standard for operation and control accuracy, so as to determine the operation and control accuracy test standard.

S230: determining the operation and control track length when the unmanned vehicle is operated and controlled by the driving control system in the unmanned vehicle, based on the obtained traveling data information.

For example, the traveling data information used for testing can be obtained based on the data information obtained by a data monitoring device provided in the unmanned vehicle in the traveling process, and the traveling data information transmitted by a wireless transceiver device to the testing apparatus for executing the testing method to be implemented by the disclosure.

S240: determining the standard operation and control distance when the driving control system operates and controls the unmanned vehicle, based on the preset operation and control accuracy test standard.

For example, the current traveling data value of unmanned vehicle can be determined based on the traveling data information, and the standard operation and control distance when the driving control system operates and controls the unmanned vehicle can be determined on such basis with reference to the mapping relation between the traveling data value and standard operation and control distance comprised in the operation and control accuracy test standard.

S250: comparing the operation and control track length with the standard operation and control distance to determine a test result of the operation and control accuracy of the driving control system.

For example, if the operation and control track length obtained when the driving control system operates and controls the unmanned vehicle is 35 cm, and the standard operation and control distance corresponding to the current traveling speed value is 33.33 cm. Accordingly, the currently determined operation and control track length of the driving control system does not meet the operation and control accuracy test standard, namely, the operation and control accuracy does not meet the requirement on safe driving, and the safe driving of unmanned vehicle can only be guaranteed by improving the operation and control accuracy of the driving control system.

The technical solution of Example 2 of the disclosure specifies the process for predetermining the operation and control accuracy test standard, and the operation and control accuracy test standard constitutes apart of the overall quality test standard relevant to the unmanned vehicle for the technicians to assess relevant operational performances of unmanned vehicle, so as to test the operation and control accuracy of driving control system in unmanned vehicle based on the preset operation and control accuracy test standard, thereby guaranteeing that the driving control system in unmanned vehicle can operate and control the unmanned vehicle accurately in practical traveling process, so as to protect the safety of the vehicle in operation, transportation environment and lives of passengers when driving the unmanned vehicle.

Example III

Figure 3A:
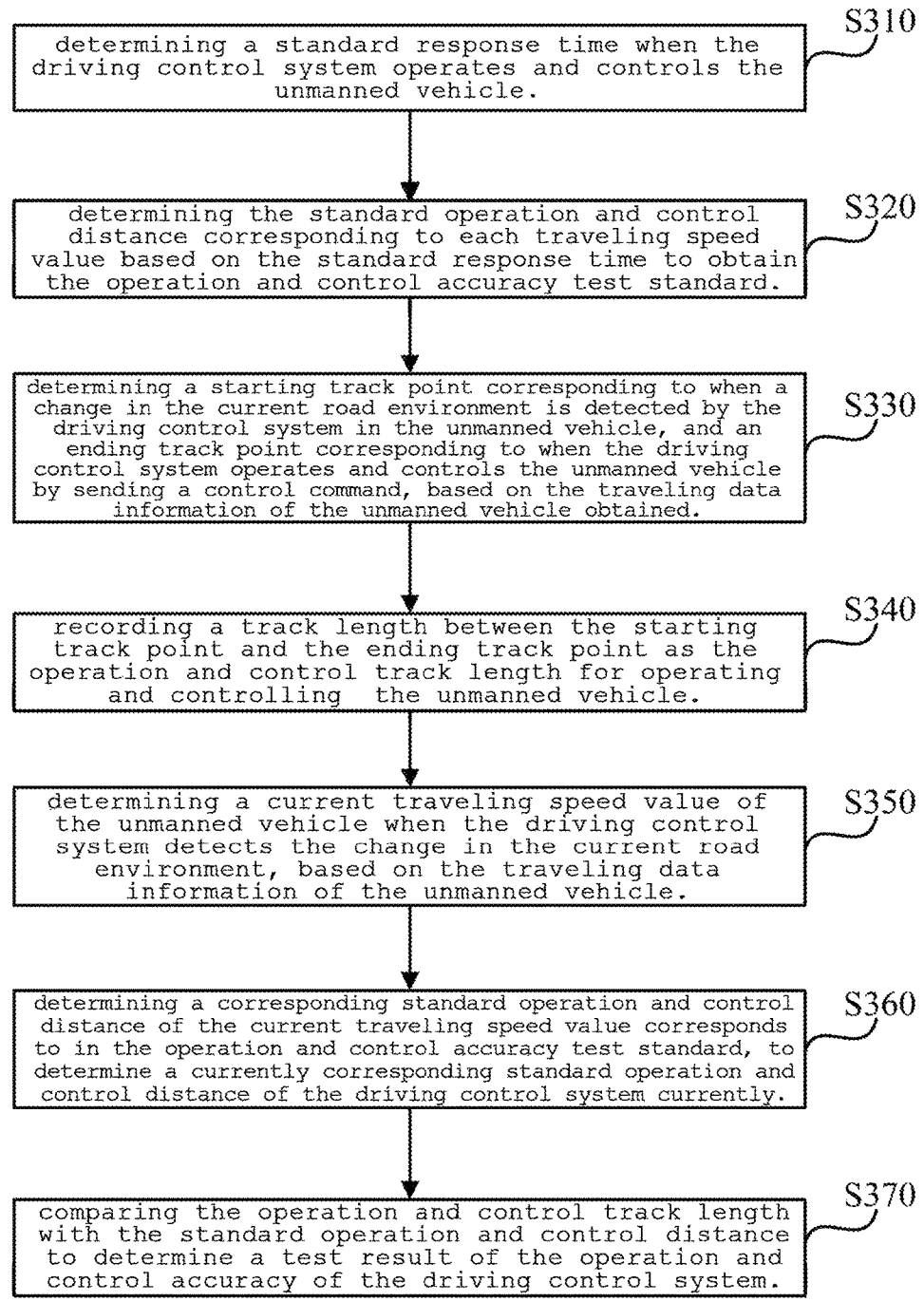
FIG. 3a illustrates a flow chart of a method for testing operation and control accuracy of a driving control system in an unmanned vehicle provided in Example 3 of the disclosure.

FIG. 3a illustrates a flow chart of a method for testing operation and control accuracy of a driving control system in an unmanned vehicle provided in Example 3 of the disclosure. Example 3 optimizes the above examples. In this example, determining an operation and control track length when the unmanned vehicle is operated and controlled by the driving control system in the unmanned vehicle is further unfolded as determining a starting track point corresponding to when a change in the current road environment is detected by the driving control system in the unmanned vehicle, and an ending track point corresponding to when the driving control system operates and controls the unmanned vehicle by sending an operating and controlling command; and recording a track length between the starting track point and the ending track point as the operation and control track length for operating and controlling the unmanned vehicle.

Further, determining the standard operation and control distance when the driving control system operates and controls the unmanned vehicle, based on the preset operation and control accuracy test standard, comprises:

determining a current traveling speed value of the unmanned vehicle when the driving control system detects a change in the current road environment, based on the traveling data information of the unmanned vehicle; and determining a corresponding standard operation and control distance of the current traveling speed value in the operation and control accuracy test standard, to determine a currently corresponding standard operation and control distance of the driving control system currently.

As shown in FIG. 3a, the method for testing operation and control accuracy of a driving control system in an unmanned vehicle provided in Example 3 of the disclosure specifically comprises:

S310: determining a standard response time when the driving control system operates and controls the unmanned vehicle.

S320: determining the standard operation and control distance corresponding to a traveling speed value based on the standard response time to obtain the operation and control accuracy test standard.

In this example, the specific process for setting the operation and control accuracy test standard based on steps S310 and S320 has been elaborated in the above examples, and will not be elaborated in detail here.

S330: determining a starting track point corresponding to when a change in the current road environment is detected by the driving control system in the unmanned vehicle, and an ending track point corresponding to when the driving control system operates and controls the unmanned vehicle by sending an operating and controlling command, based on the traveling data information of the unmanned vehicle obtained.

In this example, the traveling data information of unmanned vehicle can be monitored by a data monitoring device, and the traveling data information can be transmitted by the data monitoring device to a testing apparatus from which the traveling data information can be obtained. In addition, during the traveling process of unmanned vehicle, the driving control system in unmanned vehicle is mainly relied on for driverless driving of the unmanned vehicle.

In this example, when a detection module in driving control system detects a change in the current road environment, the current position of the unmanned vehicle would be monitored by data monitoring device as a specific position information. Then, the testing apparatus would obtain the specific position information, and determines the track point corresponding to the position of unmanned vehicle when the current road environment changes, and this track point is called a starting track point. Similarly, a control module of driving control system may send corresponding operating and controlling command according to the change of road environment, so as to operate and control the unmanned vehicle based on the operating and controlling command. The current position of unmanned vehicle when the control module sends the operating and controlling command would also be monitored by data monitoring device as a specific position information, and the testing apparatus would also determine the track point corresponding to the position of unmanned vehicle based on the specific position information obtained, and this track point is called an ending track point.

S340: recording a track length between the starting track point and the ending track point as the operation and control track length for operating and controlling the unmanned vehicle.

In this example, after determining the starting track point corresponding to when a change in the current road environment is detected by the driving control system, and an ending track point corresponding to sending an operating and controlling command, the traveling track between the starting track point and the ending track point can be obtained, and the track length can be determined which can be recorded as operation and control track length.

Figure 3B:
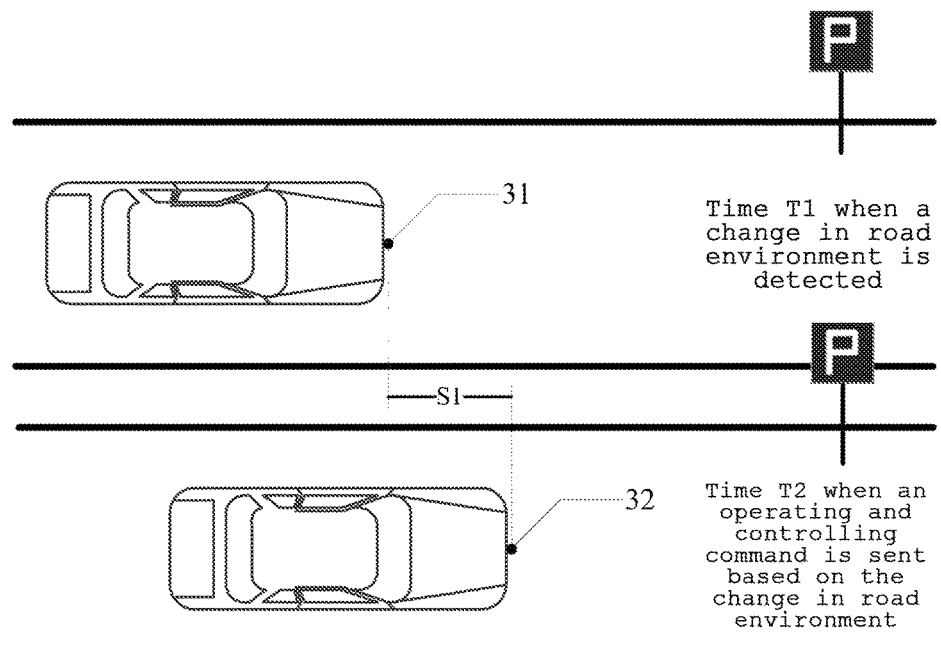
FIG. 3b illustrates a schematic diagram for an operation and control track length formed when the driving control system provided in Example 3 executes a parking operation and control on the unmanned vehicle.
Figure 3C:
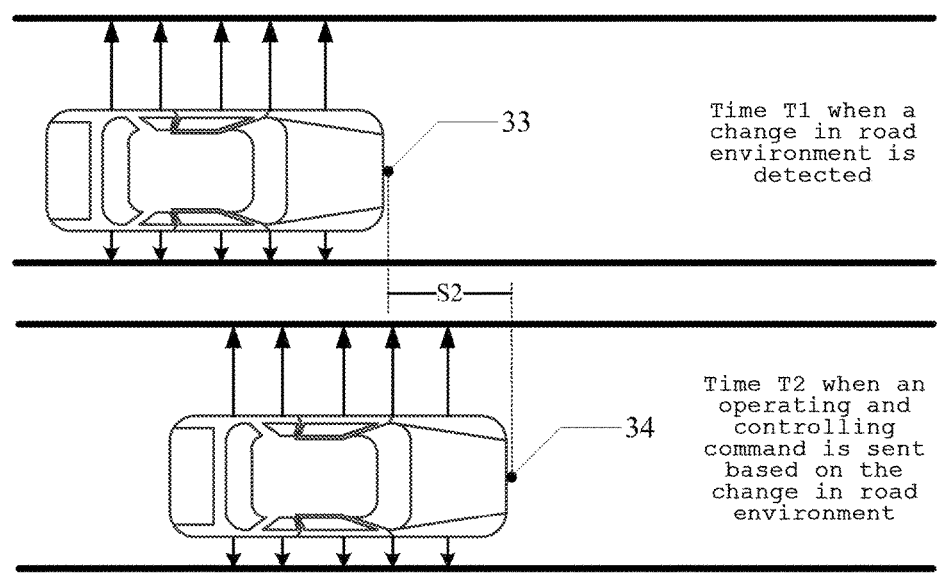
FIG. 3c illustrates a schematic diagram for an operation and control track length formed when the driving control system provided in Example 3 executes a lane holding operation and control on the unmanned vehicle.
Figure 3D:
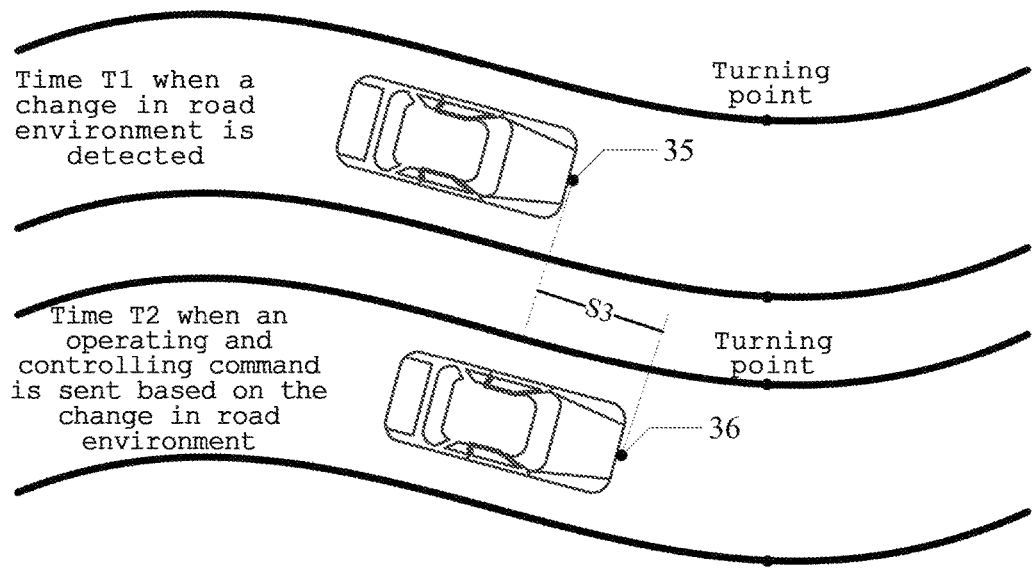
FIG. 3d illustrates a schematic diagram for an operation and control track length formed when the driving control system provided in Example 3 executes a turning operation and control on the unmanned vehicle.

In addition, the example also illustrates a schematic diagram for an operation and control track length formed when the driving control system operates and controls the unmanned vehicle, wherein FIG. 3b illustrates a schematic diagram for an operation and control track length formed when the driving control system provided in Example 3 executes a parking operation and control on the unmanned vehicle; FIG. 3c illustrates a schematic diagram for an operation and control track length formed when the driving control system provided in Example 3 executes a lane holding operation and control on the unmanned vehicle; FIG. 3d illustrates a schematic diagram for an operation and control track length formed when the driving control system provided in Example 3 executes a turning operation and control on the unmanned vehicle.

It should be elaborated that the driving control system takes a short time to respond from detecting a change in the current road environment to sending corresponding operating and controlling command. If the operation and control track length formed by the unmanned vehicle during the response time is directly demonstrated in the same scenario, it cannot clearly represent the traveling motion of the unmanned vehicle during the response time. Accordingly, FIGS. 3b, 3c and 3d all illustrate the driving control system detecting a change in the current road environment and sending an operating and controlling command based on the change in the current road environment as two time points in one scenario respectively.

As shown in FIG. 3b, the first spot 31 in the Figure indicates the track point when the detection module in the driving control system in driving control system in unmanned vehicle detects a change in road environment, which is recorded as a starting track point of parking operation and control. Here, the change in road environment detected specifically is that a stop sign is found in front of the road. The second spot 32 in the Figure indicates the track point when the control module of driving control system in unmanned vehicle sends a stop command, which is recorded as an ending track point of parking operation and control. The track line S1 formed by the first spot 31 and the second spot 32 represents the operation and control track length correspondingly formed before the driving control system imposes a parking operation and control on the unmanned vehicle.

As shown in FIG. 3c, the third spot 33 in the Figure represents the track point corresponding to when the detection module of driving control system detects a change in road environment, which is recorded as a starting track point of lane holding operation and control. Here, the change in road environment detected specifically is that the lane deviation detected during the traveling of unmanned vehicle. The fourth spot 34 in the Figure indicates the track point when the control module of driving control system in unmanned vehicle sends a lane holding command, which is recorded as an ending track point of lane holding operation and control. The track line S2 formed by the third spot 33 and the fourth spot 34 represents the operation and control track length correspondingly formed before the driving control system imposes a lane holding operation and control on the unmanned vehicle.

As shown in FIG. 3d, the fifth spot 35 in the Figure represents the track point corresponding to when the detection module of driving control system detects a change in road environment, which is recorded as a starting track point of lane holding operation and control. Here, the change in road environment detected specifically is detecting a turning road in front of the road the unmanned vehicle is currently driving on. The sixth spot 36 in the Figure indicates the track point when the control module of driving control system in unmanned vehicle sends a turning command, which is recorded as an ending track point of in turning operation and control. The track line S3 formed by the fifth spot 35 and the sixth spot 36 represents the operation and control track length correspondingly formed before the driving control system imposes a turning operation and control on the unmanned vehicle.

S350: determining a current traveling speed value of the unmanned vehicle when the driving control system detects the change in the current road environment, based on the traveling data information of the unmanned vehicle.

In this example, it can be deemed as the unmanned vehicle travels normally at a constant traveling speed, and the data monitoring device can detect the traveling speed value of unmanned vehicle when it travels normally. Accordingly, the current traveling speed value when the driving control system detects a change in road environment can be determined. For example, if the unmanned vehicle is traveling in highway, the current traveling speed value of unmanned vehicle may be 110 km/h.

S360: determining a corresponding standard operation and control distance of the current traveling speed value in the operation and control accuracy test standard, to determine a currently corresponding standard operation and control distance of the driving control system.

In this example, when the current traveling speed value corresponding to when the driving control system detects a change in the current road environment based on step S350, the standard operation and control distance in mapping relation with the current traveling speed value can be determined based on the preset operation and control accuracy test standard, thereby the preset standard operation and control distance can be taken as the standard operation and control distance of driving control system under the current traveling speed value.

For example, when the current traveling speed value of unmanned vehicle is 110 km/h (30.56 m/s), it can be determined based on the preset operation and control accuracy test standard that a corresponding standard operation and control distance of the driving control system under the current traveling speed value is 61.12 cm.

S370: comparing the operation and control track length with the standard operation and control distance to determine a test result of the operation and control accuracy of the driving control system.

For example, if the operation and control track length obtained when driving control system operates and controls the unmanned vehicle is 60 cm, the standard operation and control distance of the current traveling speed value determined is 61.12 cm, it can be determined that the operation and control track length of driving control system meets the operation and control accuracy test standard, namely, the operation and control accuracy meets the requirement on safe driving. In practical application, the unmanned vehicle can be operated and controlled safely by driving control system.

Example 3 of the disclosure provides a technical solution that specifies the process for determining the operation and control track length, and standard operation and control distance. By this test method, the operation and control accuracy of driving control system in unmanned vehicle can be tested by operation and control accuracy test standard, thereby guaranteeing that the driving control system in unmanned vehicle can operate and control the unmanned vehicle accurately in practical traveling process, so as to protect the safety of the vehicle in operation, transportation environment and lives of passengers when driving the unmanned vehicle.

Example IV

Figure 4:
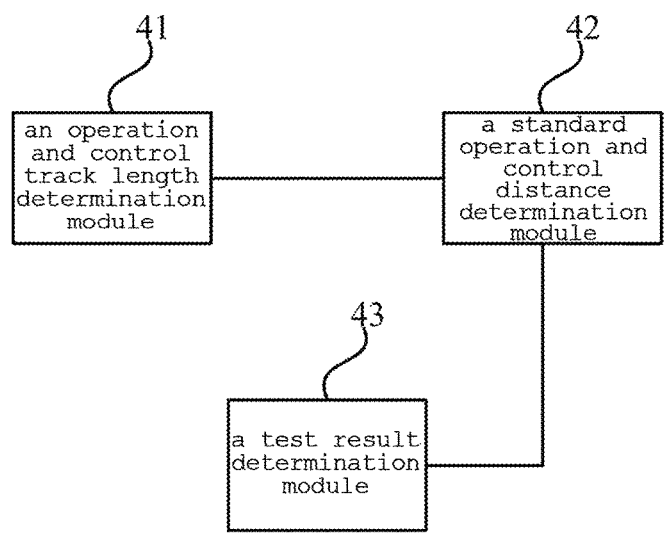
FIG. 4 illustrates a structural diagram for an apparatus for testing operation and control accuracy of a driving control system in an unmanned vehicle provided in Example 4 of the disclosure.

FIG. 4 illustrates a structural diagram for an apparatus for testing operation and control accuracy of a driving control system in an unmanned vehicle provided in Example 4 of the disclosure. The example applies to testing operation and control accuracy of a driving control system in an unmanned vehicle. The apparatus is realizable by hardware and/or software, and is generally able to be integrated in the device for testing various operational performances of the unmanned vehicle. As shown in FIG. 4, Example 4 of the disclosure provides an apparatus for testing operation and control accuracy of a driving control system in an unmanned vehicle, the apparatus comprising: an operation and control track length determination module 41, a standard operation and control distance determination module 42, and a test result determination module 43.

Wherein the operation and control track length determination module 41 is for determining an operation and control track length when the unmanned vehicle is operated and controlled by the driving control system in the unmanned vehicle, based on obtained traveling data information.

The standard operation and control distance determination module 42 is for determining a standard operation and control distance when the driving control system operates and controls the unmanned vehicle, based on a preset operation and control accuracy test standard.

The test result determination module 43 is for comparing the operation and control track length with the standard operation and control distance to determine a test result of the operation and control accuracy of the driving control system.

In this example, the testing apparatus firstly determines an operation and control track length when the unmanned vehicle is operated and controlled by the driving control system in the unmanned vehicle by an operation and control track length determination module 41, based on obtained traveling data information; then, the standard operation and control distance when the driving control system operates and controls the unmanned vehicle is determined by standard operation and control distance determination module 42 based on a preset operation and control accuracy test standard; finally, the operation and control track length and the standard operation and control distance are compared by the test result determination module 43 to determine a test result of the operation and control accuracy of the driving control system.

The technical solution provided in example of the disclosure can test the operation and control accuracy of driving control system in unmanned vehicle by preset operation and control accuracy test standard, thereby guaranteeing that the driving control system in unmanned vehicle can operate and control the unmanned vehicle accurately in practical traveling process, so as to protect the safety of the vehicle in operation, transportation environment and lives of passengers when driving the unmanned vehicle.

Furthermore, the apparatus further comprises a test standard determination module, wherein the test standard determination module comprises: a standard response time determination unit configured to determine a standard response time when the driving control system operates and controls the unmanned vehicle; and a test standard determination unit configured to determine the standard operation and control distance corresponding to a traveling speed value based on the standard response time to obtain the operation and control accuracy test standard.

Further, the test standard determination unit is specifically configured to:

set a calculation formula for the standard operation and control distance $D=V*t$, wherein D is the standard operation and control distance corresponding to a traveling speed value, V is a traveling speed value, t is the standard response time when the driving control system operates and controls the unmanned vehicle; and determining the standard operation and control distance corresponding to a traveling speed value based on the calculation formula, the standard response time and at least one traveling speed value, to obtain the operation and control accuracy test standard.

Further, the operation and control track length determination module 41 is specifically configured to:

determine a starting track point corresponding to when a change in current road environment is detected by the driving control system in the unmanned vehicle, and an ending track point corresponding to when the driving control system operates and controls the unmanned vehicle by sending a control command, based on the traveling data information of the unmanned vehicle obtained; and recording a track length between the starting track point and the ending track point as the operation and control track length for operating and controlling the unmanned vehicle.

Further, the standard operation and control distance determination module 42 is specifically configured to:

determine a current traveling speed value of the unmanned vehicle when the driving control system detects the change in the current road environment, based on the traveling data information of the unmanned vehicle; and determining a corresponding standard operation and control distance of the current traveling speed value in the operation and control accuracy test standard, to determine a currently corresponding standard operation and control distance of the driving control system.

It is noted that the above are merely preferable exemplary embodiments of the present disclosure and the technical mechanisms adopted. Those skilled in the art would appreciate that the disclosure is not limited to the specific embodiments here. For those skilled in the art, various significant alternation, amendment or replacement would not deviate from the protection scope of the disclosure. Accordingly, the disclosure is elaborated in detail through the above embodiments, whereas the disclosure is not only limited to the above embodiments, it may also encompass more other equivalent embodiments as long as they do not deviate from the thought of the present disclosure. The scope of the disclosure is determined by the scope of the claims attached.

What is claimed is:

1. A method for testing operation and control accuracy of a driving control system in an unmanned vehicle, the method comprising:
    determining an operation and control track length when the unmanned vehicle is operated and controlled by the driving control system in the unmanned vehicle, based on obtained traveling data information;

determining a standard operation and control distance when the driving control system operates and controls the unmanned vehicle, based on a preset operation and control accuracy test standard; and comparing the operation and control track length with the standard operation and control distance to determine a test result of the operation and control accuracy of the driving control system.

2. The method according to claim 1, wherein the operation and control accuracy test standard is set by:

determining a standard response time when the driving control system operates and controls the unmanned vehicle; and determining the standard operation and control distance corresponding to a traveling speed value based on the standard response time to obtain the operation and control accuracy test standard.

3. The method according to claim 2, wherein the determining the standard operation and control distance corresponding to a traveling speed value based on the standard response time comprises:

setting a calculation formula for the standard operation and control distance D=V*t, wherein D is the standard operation and control distance corresponding to a traveling speed value, V is a traveling speed value, t is the standard response time when the driving control system operates and controls the unmanned vehicle; and determining the standard operation and control distance corresponding to the traveling speed value based on the calculation formula, the standard response time and at least one traveling speed value.

4. The method according to claim 1, wherein the determining the operation and control track length when the unmanned vehicle is operated and controlled by the driving control system in the unmanned vehicle, based on the obtained traveling data information, comprises:

determining a starting track point corresponding to when a change in a current road environment is detected by the driving control system in the unmanned vehicle, and an ending track point corresponding to when the driving control system operates and controls the unmanned vehicle by sending an operating and controlling command, based on the obtained traveling data information of the unmanned vehicle; and recording a track length between the starting track point and the ending track point as the operation and control track length for operating and controlling the unmanned vehicle.

5. The method according to claim 1, wherein the determining the standard operation and control distance when the driving control system operates and controls the unmanned vehicle, based on the preset operation and control accuracy test standard, comprises:

determining a current traveling speed value of the unmanned vehicle when the driving control system detects the change in a current road environment, based on the traveling data information of the unmanned vehicle; and determining a corresponding standard operation and control distance of the current traveling speed value in the operation and control accuracy test standard, to determine a currently corresponding standard operation and control distance of the driving control system.

6. The method according to claim 5, wherein operation and control operations executed by the driving control system to the unmanned vehicle include parking operation and control, lane holding operation and control, and turning operation and control.

7. An apparatus for testing operation and control accuracy of a driving control system in an unmanned vehicle, the apparatus comprising:

at least one processor; and a memory storing instructions, which when executed by the at least one processor, cause the at least one processor to perform operations, the operations comprising:

determining an operation and control track length when the unmanned vehicle is operated and controlled by the driving control system in the unmanned vehicle, based on obtained traveling data information;

determining a standard operation and control distance when the driving control system operates and controls the unmanned vehicle, based on a preset operation and control accuracy test standard; and comparing the operation and control track length with the standard operation and control distance to determine a test result of the operation and control accuracy of the driving control system.

8. The apparatus according to claim 7, further comprising operations to set the operation and control accuracy test standard:

determining a standard response time when the driving control system operates and controls the unmanned vehicle; and determining the standard operation and control distance corresponding to a traveling speed value based on the standard response time to obtain the operation and control accuracy test standard.

9. The apparatus according to claim 8, wherein the determining the standard operation and control distance corresponding to a traveling speed value based on the standard response time comprises:

setting a calculation formula for the standard operation and control distance D=V*t, wherein D is the standard operation and control distance corresponding to a traveling speed value, V is a traveling speed value, t is the standard response time when the driving control system operates and controls the unmanned vehicle; and determining the standard operation and control distance corresponding to the traveling speed value based on the calculation formula, the standard response time and at least one traveling speed value, to obtain the operation and control accuracy test standard.

10. The apparatus according to claim 7, wherein the determining the operation and control track length when the unmanned vehicle is operated and controlled by the driving control system in the unmanned vehicle, based on the obtained traveling data information, comprises:

determining a starting track point corresponding to when a change in a current road environment is detected by the driving control system in the unmanned vehicle, and an ending track point corresponding to when the driving control system operates and controls the unmanned vehicle by sending an operating and controlling command, based on the traveling data information of the unmanned vehicle obtained; and recording a track length between the starting track point and the ending track point as the operation and control track length for operating and controlling the unmanned vehicle.

11. The apparatus according to claim 7, wherein the determining the standard operation and control distance when the driving control system operates and controls the unmanned vehicle, based on the preset operation and control accuracy test standard, comprises:
- determining a current traveling speed value of the unmanned vehicle when the driving control system detects the change in a current road environment, based on the traveling data information of the unmanned vehicle; and
- determining a corresponding standard operation and control distance of the current traveling speed value in the operation and control accuracy test standard, to determine a currently corresponding standard operation and control distance of the driving control system.

12. The apparatus according to claim 11, wherein operating and controlling operations executed by the driving control system to the unmanned vehicle include parking operation and control, lane holding operation and control, and turning operation and control.

13. A non-transitory computer storage medium storing a computer program, which when executed by one or more processors, cause the one or more processors to perform operations, the operations comprising:
- determining an operation and control track length when the unmanned vehicle is operated and controlled by the driving control system in the unmanned vehicle, based on obtained traveling data information;
- determining a standard operation and control distance when the driving control system operates and controls the unmanned vehicle, based on a preset operation and control accuracy test standard; and
- comparing the operation and control track length with the standard operation and control distance to determine a test result of the operation and control accuracy of the driving control system.

14. The non-transitory computer storage medium according to claim 13, wherein the operation and control accuracy test standard is set in a method comprising:
- determining a standard response time when the driving control system operates and controls the unmanned vehicle; and
- determining the standard operation and control distance corresponding to a traveling speed value based on the standard response time to obtain the operation and control accuracy test standard.

15. The non-transitory computer storage medium according to claim 14, wherein the determining the standard operation and control distance corresponding to a traveling speed value based on the standard response time comprises:
- setting a calculation formula for the standard operation and control distance $D=V*t$, wherein D is the standard operation and control distance corresponding to a traveling speed value, V is a traveling speed value, t is the standard response time when the driving control system operates and controls the unmanned vehicle; and
- determining the standard operation and control distance corresponding to the traveling speed value based on the calculation formula, the standard response time and at least one traveling speed value.

16. The non-transitory computer storage medium according to claim 13, wherein the determining the operation and control track length when the unmanned vehicle is operated and controlled by the driving control system in the unmanned vehicle, based on the obtained traveling data information, comprises:
- determining a starting track point corresponding to when a change in a current road environment is detected by the driving control system in the unmanned vehicle, and an ending track point corresponding to when the driving control system operates and controls the unmanned vehicle by sending an operating and controlling command, based on the obtained traveling data information of the unmanned vehicle; and
- recording a track length between the starting track point and the ending track point as the operation and control track length for operating and controlling the unmanned vehicle.

17. The non-transitory computer storage medium according to claim 13, wherein the determining the standard operation and control distance when the driving control system operates and controls the unmanned vehicle, based on the preset operation and control accuracy test standard, comprises:
- determining a current traveling speed value of the unmanned vehicle when the driving control system detects the change in a current road environment, based on the traveling data information of the unmanned vehicle; and
- determining a corresponding standard operation and control distance of the current traveling speed value in the operation and control accuracy test standard, to determine a currently corresponding standard operation and control distance of the driving control system.

18. The non-transitory computer storage medium according to claim 17, wherein operation and control operations executed by the driving control system to the unmanned vehicle include parking operation and control, lane holding operation and control, and turning operation and control.

* * * * *